(12) United States Patent
Yamazaki et al.

(10) Patent No.: US 11,956,593 B2
(45) Date of Patent: Apr. 9, 2024

(54) SOUNDING DEVICE FOR PET TOY AND PET TOY

(71) Applicant: TOMY COMPANY, LTD., Tokyo (JP)

(72) Inventors: Junko Yamazaki, Tokyo (JP); Gen Nagashima, Tokyo (JP)

(73) Assignee: TOMY COMPANY, LTD., Tokyo (JP)

( * ) Notice: Subject to any disclaimer, the term of this patent is extended or adjusted under 35 U.S.C. 154(b) by 176 days.

(21) Appl. No.: 17/426,055

(22) PCT Filed: Apr. 13, 2021

(86) PCT No.: PCT/JP2021/015280
§ 371 (c)(1),
(2) Date: Jul. 27, 2021

(87) PCT Pub. No.: WO2021/210568
PCT Pub. Date: Oct. 21, 2021

(65) Prior Publication Data
US 2022/0322000 A1    Oct. 6, 2022

(30) Foreign Application Priority Data

Apr. 17, 2020 (JP) ................................. 2020-074103

(51) Int. Cl.
*A63H 3/28* (2006.01)
*H04R 1/46* (2006.01)

(52) U.S. Cl.
CPC ................. *H04R 1/46* (2013.01); *A63H 3/28* (2013.01); *A63H 2200/00* (2013.01)

(58) Field of Classification Search
CPC ........ A63H 2200/00; A63H 3/28; H04R 1/46; H04R 2460/13
USPC ................................................... 381/151, 326
See application file for complete search history.

(56) References Cited

U.S. PATENT DOCUMENTS

| | | | |
|---|---|---|---|
| 8,229,521 B2* | 7/2012 | Kang | H04R 1/1091 381/74 |
| 10,658,995 B1* | 5/2020 | Bowers | H04R 1/1041 |
| 2013/0204881 A1* | 8/2013 | Su | G06N 5/043 707/748 |

FOREIGN PATENT DOCUMENTS

JP       2007-81633 A      3/2007

* cited by examiner

*Primary Examiner* — George C Monikang
(74) *Attorney, Agent, or Firm* — IP Business Solutions, LLC

(57) ABSTRACT

A sounding device a normal speaker being configured to output a first sound, a bone conduction speaker being configured to output a second sound, a storage unit being configured to store first and second data corresponding to the first and second sounds respectively, and an output control unit being configured to control outputting the first sound from the normal speaker and the second sound from the bone conduction speaker. The first sound is of talking. The second sound is of a pet. The output control unit is configured to control the bone conduction speaker to output the first sound, and to control the normal speaker to output the second sound.

7 Claims, 4 Drawing Sheets

SOUNDING DEVICE FOR PET TOY AND PET TOY

CROSS-REFERENCE TO THE RELATED APPLICATION

This is a National Stage Application of PCT Application No. PCT/JP2021/15280 claiming priority to Japanese Patent Application No. 2020-074103 filed on Apr. 17, 2020. The entire content of Japanese Patent Application No. 2020-074103 is incorporated herein by reference.

BACKGROUND

Technical Field

The present invention relates to a sounding device for a pet toy and a pet toy.

Background Art

Known from the past are sounding devices in which, to reduce sound leakage that occurs when a bone conduction speaker is not in contact with a human body, a contact sensor was provided that detects whether the bone conduction speaker is in contact with the human body, and when not in contact, output of the bone conduction speaker is blocked (see Patent Document 1, for example).

PRIOR ART DOCUMENTS

Patent Documents

Patent Document 1: Unexamined Patent Publication No. 2007-81633

SUMMARY

Problems the Invention is Intended to Solve

However, it is difficult to completely prevent sound leakage even when the bone conduction speaker is in contact with a human body. Also, the abovementioned sounding device is used for the purpose of the person using it to listen to audio by bone conduction, and it was difficult to use it for other purposes.

The present invention was created considering these points, and its purpose is to provide a novel sounding device and a pet toy that can use the bone conduction speaker, and can also be used for other applications.

Means for Solving the Problems

A sounding device a normal speaker being configured to output a first sound, a bone conduction speaker being configured to output a second sound, a storage unit being configured to store first and second data corresponding to the first and second sounds respectively, and an output control unit being configured to control outputting the first sound from the normal speaker and the second sound from the bone conduction speaker. The first sound is of talking. The second sound is of a pet. The output control unit is configured to control the bone conduction speaker to output the first sound, and to control the normal speaker to output the second sound.

DETAILED DESCRIPTION OF PREFERRED EMBODIMENTS

Following, embodiments of the present invention are explained based on the figures.

Figure 1:
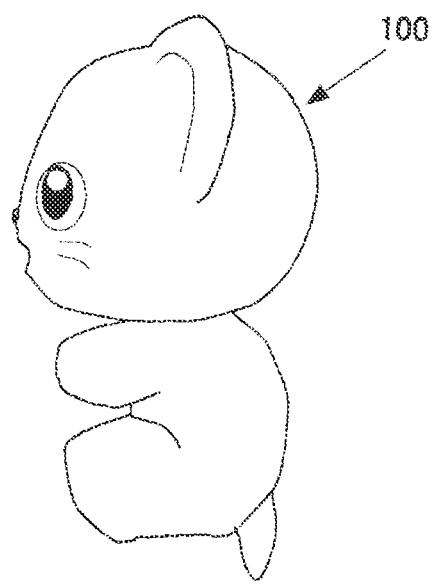
FIG. 1 is a perspective view of a pet toy of an embodiment.

FIG. 1 is a perspective view showing a pet toy 100 of an embodiment.

This pet toy 100 is a stuffed animal of a cat, and incorporates a sounding device 110 inside.

Figure 2:
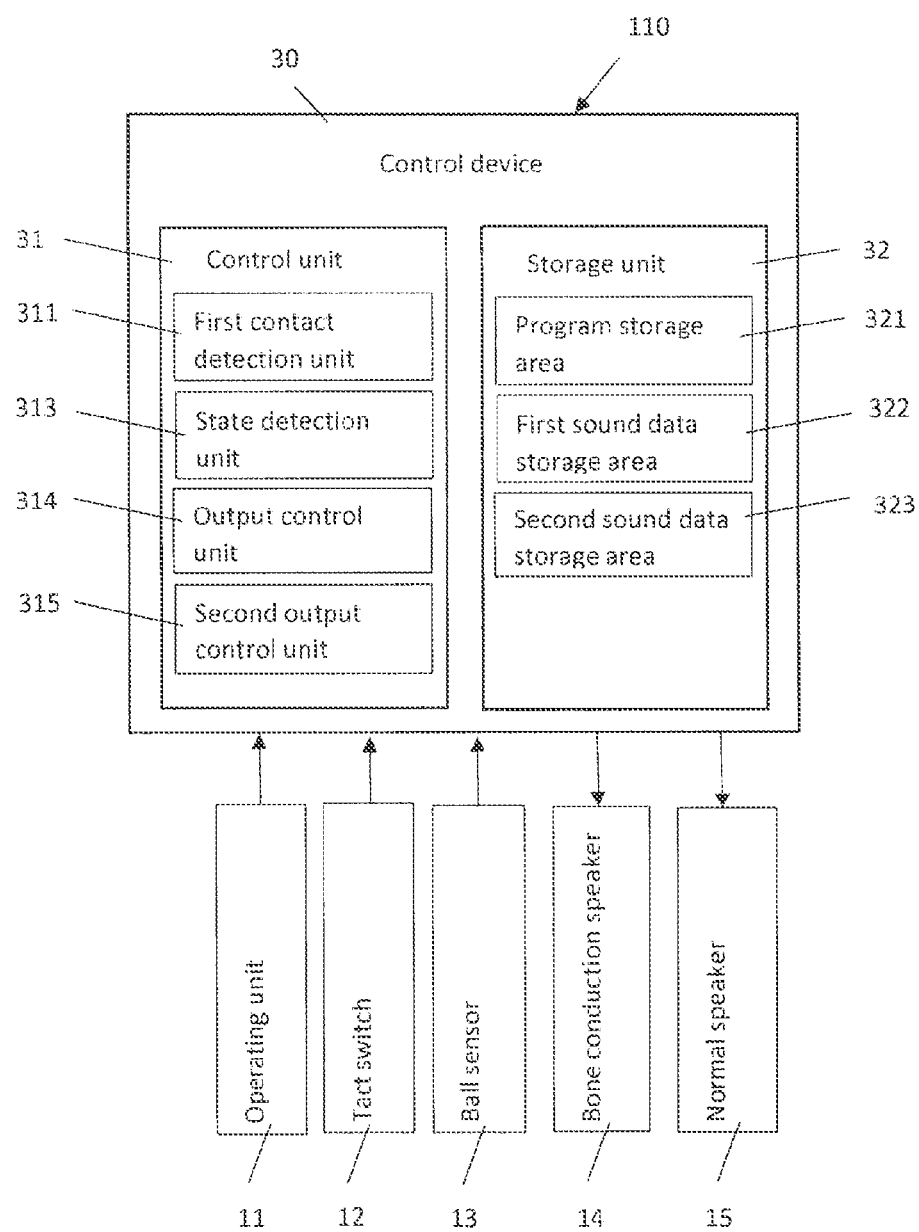
FIG. 2 is a block diagram showing the control configuration of the pet toy of FIG. 1.

FIG. 2 is a block diagram showing the control configuration of the sounding device 110 of the present embodiment.

The sound device 110 comprises an operating unit 11, a tact switch 12, a ball sensor 13, a bone conduction speaker 14, a normal speaker 15, a tact switch 16, and a control device 30. The operating unit 11 is constituted by a power button, etc., and is installed at a location that does not stand out such as the back, or the bottom surface, etc., of the pet toy 100. Also, the bone conduction speaker 14 and the tact switch 12 are installed near the forehead of the pet toy 100. Here, it is preferable that the tact switch 12 be provided on the back side of the bone conduction speaker 14, and be indirectly operated via the bone conduction speaker 14 when the bone conduction speaker 14 is in contact with a human body, etc. However, it is also possible to provide the tact switch 12 at the side of the bone conduction speaker 14, and to simultaneously press the tact switch 12 on the human body when the bone conduction speaker 14 is pressed on the human body.

Also, the normal speaker 15 is installed at the head or the torso of the pet toy 100, and the ball sensor 13 is installed at the head or the torso of the pet toy 100.

Also, the tact switch 16 is provided at the mouth of the pet toy 100.

The control device 30 is a computer comprising: a control unit 31 consisting of a processor such as a CPU (Central Processing Unit) (not illustrated), and a storage unit 32 consisting of ROM (Read Only Memory) and RAM (Random Access Memory), etc. (neither illustrated).

In the storage unit 32, provided are a program storage area 321, a first sound data storage area 322, and a second sound data storage area 323, etc.

Stored in the program storage area 321 are various programs, etc. for performing prescribed operations on the sounding device 110. The control unit 31 opens these programs in a RAM work area, for example, and by the various programs being executed in the control unit 31, integrated control is done for each part of the control configuration.

In the first sound data storage area 322, sound data (second sound data) corresponding to the audio (second sound) emitted from the bone conduction speaker 14 is stored, and in the second sound data storage area 323, sound data (first sound data) corresponding to the audio (first sound) emitted from the normal speaker 15 is stored. The sound data stored in the first sound data storage area 322 and the sound data stored in the second data storage area 323 are associated with each other. As sound data stored in the second sound data storage area 323, for example, the sound of a cat in various scenes is stored, and as sound data stored in the first sound data storage area 322, the talking sound representing the cat's feelings in various scenes is stored.

When viewed functionally, the control unit 31 comprises a first contact detection unit 311, a state detection unit 312, a first output control unit 313, a second output control unit 314, and a second contact detection unit 315, etc. The functions of the first contact detection unit 311, the state detection unit 312, the first output control unit 313, the second output control unit 314, and the second contact detection unit 315, etc., are realized in collaboration with the programs and data stored in the control unit 31 and the storage unit 32.

The first contact detection unit 311 detects contact of the bone conduction speaker 14 with a human body, etc., based on electric signals from the tact switch 12.

The state detection unit 312 detects the orientation of the pet toy 100 or vibration applied to the pet toy 100 based on electric signals from the ball sensor 13.

The first output control unit 313 controls the audio contents and sound volume output from the bone conduction speaker 14. The audio is content according to the status of the pet toy 100 detected by the contact detection unit 311 and the state detection unit 312. The audio in this case is words representing the feelings of a cat that a human can understand. The sound volume is adjustable by operating the operating unit 11. Also, the sound volume automatically increases when contact with a person or object is detected by the contact detection unit 311.

The second output control unit 314 controls the audio content and the sound volume output from the normal speaker 15. The audio is content according to the state of the pet toy 100 detected by the contact detection unit 311 and the state detection unit 312. In this case, the audio is the sound of a cat. Also, the sound volume is automatically decreased when contact with a person or an object is detected by the contact detection unit 311.

The second contact detection unit 315 detects contact between the mouth of the pet toy 100 and an object, etc., based on electric signals from the tact switch 16. When contact of an object, etc., on the mouth of the pet toy 100 is detected by this second contact detection unit 315, the audio content of the first output control unit 313 and the second output control unit 314 is changed.

Next, the operation of the pet toy 100 is explained.

The status in FIG. 1 is a state in which the pet toy 100 is sitting.

In this state, audio is output from both the bone conduction speaker 14 and the normal speaker 15. For example, the sound emitted from the normal speaker 15 is the meow of a cat such as "meow," meeowww," etc. Meanwhile, the sound emitted from the bone conduction speaker 14 is language such as, "I want to eat a snack," or, "I'm hungry."

In this case, the bone conduction speaker 14 is in a state directly touched by air, so the sound leakage increases, but the sound volume of the bone conduction speaker 14 becomes lower, so there is very little sound leakage. Furthermore, sound is output from the normal speaker 15, so the sound leakage from the bone conduction speaker 14 is effectively drowned out by the sound from the normal speaker 15.

Figure 6:
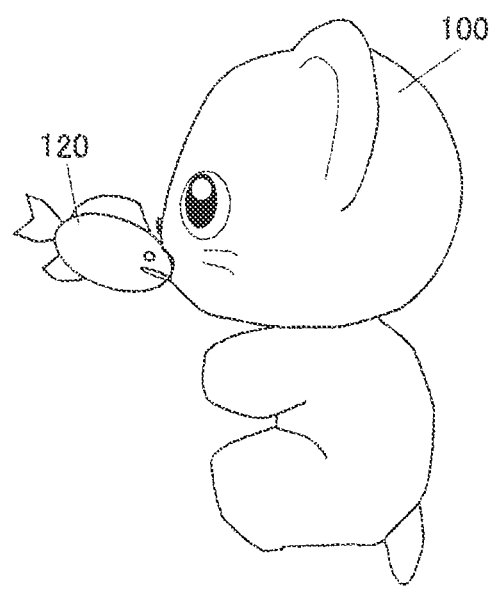
FIG. 6 is a perspective view showing the state of an object touched on the mouth of the pet toy.

Also, in this case, as shown in FIG. 6, if an object (a model fish, for example) is touched on the tact switch 16 of the mouth, a sound such as "chomp, chomp" is output from the normal speaker 15. Meanwhile, the sounds "I'm full," "Delicious," etc., are output from the bone conduction speaker 14.

Figure 3:
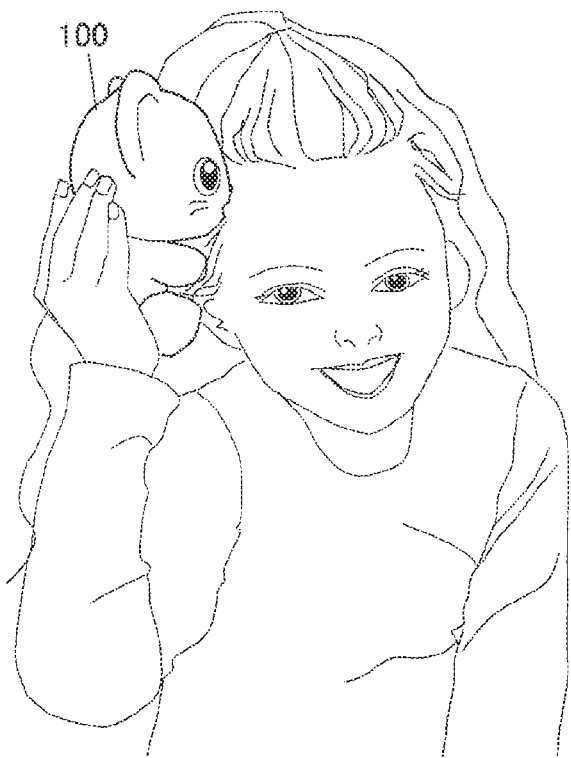
FIG. 3 is a perspective view showing the state of the pet toy of FIG. 1 touching a human body.

The state in FIG. 3 is the state of the bone conduction speaker 14 of the pet toy 100 being touched to the head.

In this case as well, output is done from the normal speaker 15 and the bone conduction speaker 14. For example, the sound emitted from the normal speaker 15 is the same sound of a cat such as, "meow, "meeeoooww," etc., in the status of FIG. 1. Meanwhile, the sound emitted from the bone conduction speaker 14 is the language "I'm full," "Delicious," etc. In this case, when contact of the bone conduction speaker 14 is detected, the sound volume of the bone conduction speaker 14 increases, and the sound volume of the normal speaker 15 decreases.

In this case, the bone conduction speaker 14 is touched on the head of a person, so there is little sound leakage, but sound is also output from the normal speaker 15 though the sound volume is low, so the sound leakage from the bone conduction speaker 14 is effectively drowned out by the sound from the normal speaker 15. As a result, a person on which the bone conduction speaker 14 is touched can easily hear the sound by bone conduction.

Figure 4:
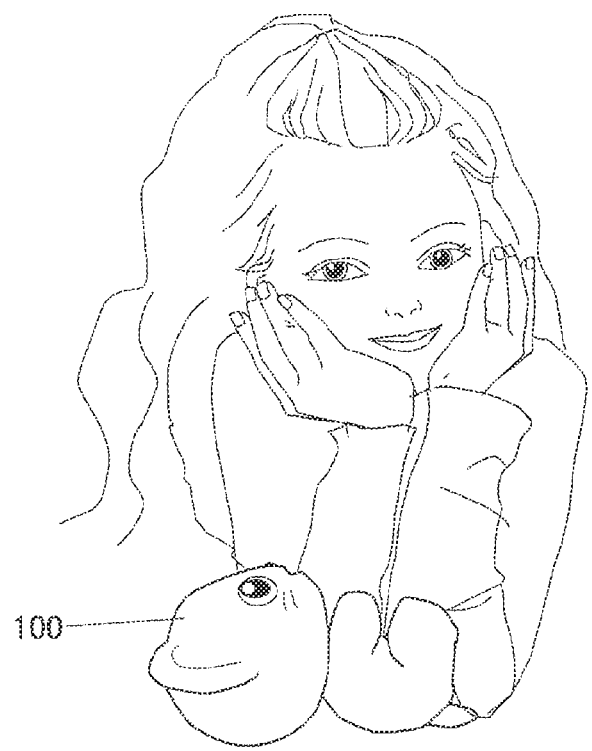
FIG. 4 is a perspective view showing the state of the pet toy of FIG. 1 laid on its back.

The state in FIG. 4 is the state with the pet toy 100 laid on its back.

In this case, the orientation of the pet toy 100 is detected by the state detection unit 312. Then, output is done from the normal speaker 15 and the bone conduction speaker 14. For example, the sound emitted from the normal speaker 15 is the sound of a cat breathing when sleeping, "suu, suu," "guu, guu," and meanwhile, the sound emitted from the bone conduction speaker 14 is the speaking sound of the contents of a dream, etc.

In this case as well, the bone conduction speaker 14 is in a state directly touched by air, so the sound leakage increases, but the sound volume of the bone conduction speaker 14 becomes lower, so there is only a slight amount of sound leakage. Furthermore, sound is also output from the normal speaker, so the sound leakage from the bone conduction speaker 14 is effectively drowned out by the sound from the normal speaker 15.

Figure 5:
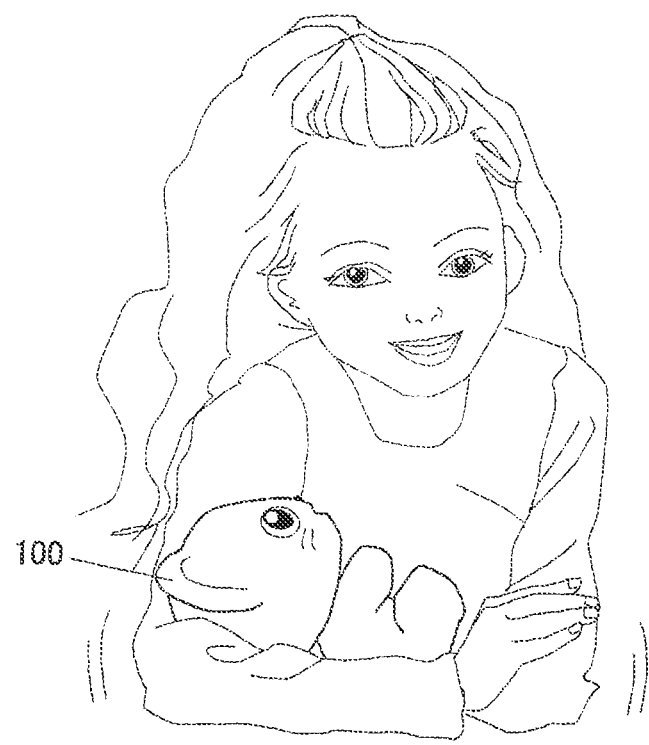
FIG. 5 is a perspective view showing the state of cuddling the pet toy of FIG. 1.

The state in FIG. 5 is the state with the pet toy 100 being shaken up and down and cuddled.

In this state, the audio from the bone conduction speaker 14 and the normal speaker 15 is output normally. For example, the sound emitted from the normal speaker 15 is the sound of a cat such as "giggle," etc. Meanwhile, the sound emitted from the bone conduction speaker 14 is language such as "Do more."

In this case, the bone conduction speaker 14 is in a state directly contacted by air, so the sound leakage increases, but the sound volume of the bone conduction speaker is lower, so there is very little sound leakage. Furthermore, sound is also output from the normal speaker, so the sound leakage from the bone conduction speaker 14 is effectively drowned out by the sound from the normal speaker 15. However, if an object 120 is touched on the tact switch 12 of the mouth, in a state with the output of the normal speaker 15 reduced, it is possible to hear the sound from the bone conduction speaker 14.

Above, embodiments of the present invention were explained, but the present invention is not limited to these embodiments, and various modifications are possible within a range that does not stray from its gist.

With the embodiments noted above, citing the pet toy 100, animal sounds were output on the bone conduction speaker 14 side, and language on the normal speaker 15 side, but it is also possible to have Japanese words output on the bone conduction speaker 14 side, and translated English words of those words output on the normal speaker 15 side.

Also, with the embodiments noted above, even when the bone conduction speaker 14 is not touched on a human body, etc., sound was made to be output from the bone conduction speaker 14 and the normal speaker 15, but it is also possible to configure so that sound is output from the bone conduction speaker 14 only when the bone conduction speaker 14 is touched on a human body, etc.

Also, with the embodiments noted above, when the bone conduction speaker 14 was touched on a human body, etc., the sound volume from the bone conduction speaker 14 was increased, whereas the sound volume from the normal speaker 15 was decreased, but it is sufficient to have the sound volume of the bone conduction speaker 14 relatively increase, so it is also possible to have the sound volume of the normal speaker 15 remain as is when the bone conduction speaker 14 is touched on a human body, etc. In short, when the sound leakage is drowned out, and the bone conduction speaker 14 is touched on a human body, etc., it is easier to hear the sound from the bone conduction speaker 14.

The sounding device for the pet toy can be preferably used in the field of manufacturing toys.

Effect of the Invention

According to the aspects, because the sound from the bone conduction speaker and the sound from the normal speaker are mutually different, a person with the bone conduction speaker can detect the different sounds, so it is possible to enhance the performance, and possible to realize a highly entertaining sounding device. Because both the bone conduction speaker and the normal speaker, so the utilization range is expanded. In this case, according to the aspects, when the bone conduction speaker has contacted the human body, the output control unit changes the speaker output from at least one of the bone conduction speaker and the normal speaker to a direction that makes it easier to hear the sound from the bone conduction speaker.

According to the aspects, when contact is detected by the contact detection unit, there is an increase in sound volume from the bone conduction speaker, and a decrease in sound volume from the normal speaker, so sound from the normal speaker does not become a hindrance to hearing sound by bone conduction. In this case, the sound leakage itself becomes smaller because the bone conduction speaker is touching a human body, so it is possible sufficiently drown out sound leakage even when the sound volume of the normal speaker is low. In this case, as with the fourth means, if the tact switch is provided on the back side of the bone conduction speaker, and the contact detection unit is made to indirectly detect contact of the bone conduction speaker with a human body, via the tact switch, it is possible to reliably detect contact of the bone conduction speaker with a human body.

According to the aspects, the audio output from the normal speaker and the audio output from the bone conduction speaker are different from each other, so it is possible to hear both different sounds from the person the bone conduction speaker is touching, so it is possible to enhance the performance, and possible to realize a highly entertaining sounding device.

According to the aspects, it is possible to obtain the effects of the corresponding first means to fourth means, and if made possible to hear different sounds when attached to the human body and when separated from the human body as with the fifth means, it is possible to realize an adorable pet toy. For example, by having the audio emitted from the normal speaker be the sound of a cat, but be human speech from the bone conduction speaker, it can be made as if the language of a cat is translated to human language.

The invention claimed is:

1. A sounding device comprising:
   a normal speaker being configured to output a first sound;
   a bone conduction speaker being configured to output a second sound, the first sound corresponding to the second sound;
   a storage unit being configured to store first and second data corresponding to the first and second sounds respectively; and
   an output control unit being configured to control outputting the first sound from the normal speaker and the second sound from the bone conduction speaker,
   the first sound being of a pet,
   the second sound being of talking by a human,
   the output control unit being configured to control the bone conduction speaker to output the first sound, and to control the normal speaker to output the second sound.

2. The sounding device according to claim 1, further comprising
   a contact detection unit being configured to detect whether or not the bone conduction speaker is in contact with a human body.

3. The sounding device according to claim 2, wherein
   when the contact detection unit detects the bone conduction speaker in contact with the human body, the output control unit is configured to increase second volume of the second sound, and to decrease first volume of the first sound.

4. The sounding device according to claim 2, wherein
   the bone conduction speaker includes a tact switch being configured on a back side of the bone conduction speaker, and
   the contact detection unit is configured to detect indirectly whether or not the bone conduction speaker is in contact with the human body via the tact switch.

5. The sounding device according to claim 1, wherein
   the first sound and the second sound are different from each other.

6. The sounding device according to claim 1, wherein
   the sounding device is formed in a shape of the pet,
   the pet has a head part, and
   the bone conduction speaker is configured on the head part.

7. A pet toy comprising the sounding device according to 1.

* * * * *